US007679625B1

(12) United States Patent  (10) Patent No.: US 7,679,625 B1
Fagans et al.  (45) Date of Patent: Mar. 16, 2010

(54) STRAIGHTENING DIGITAL IMAGES

(75) Inventors: Joshua D. Fagans, Redwood City, CA (US); Jeffrey L. Robbin, Los Altos, CA (US); Timothy B. Martin, Sunnyvale, CA (US); Timothy E. Wasko, High River (CA)

(73) Assignee: Apple, Inc., Cupertino, CA (US)

( * ) Notice: Subject to any disclaimer, the term of this patent is extended or adjusted under 35 U.S.C. 154(b) by 488 days.

(21) Appl. No.: 11/033,427

(22) Filed: Jan. 7, 2005

(51) Int. Cl.
 *G09G 5/00* (2006.01)
(52) U.S. Cl. ...................................... 345/650; 345/620
(58) Field of Classification Search ................ 345/656, 345/625, 649, 619, 173, 629, 651, 418, 620, 345/622, 624, 650
See application file for complete search history.

(56) References Cited

U.S. PATENT DOCUMENTS

| | | | | |
|---|---|---|---|---|
| 5,583,977 | A * | 12/1996 | Seidl | 345/619 |
| 6,313,923 | B1 * | 11/2001 | Takanashi et al. | 358/1.18 |
| 6,426,745 | B1 * | 7/2002 | Isaacs et al. | 345/419 |
| 6,538,691 | B1 * | 3/2003 | Macy et al. | 348/222.1 |
| 6,844,885 | B2 * | 1/2005 | Anderson et al. | 345/650 |
| 6,888,650 | B1 * | 5/2005 | Mizubata et al. | 358/488 |
| 6,999,209 | B2 * | 2/2006 | Kelly et al. | 358/474 |
| 7,068,855 | B2 * | 6/2006 | Simske et al. | 382/289 |
| 2001/0014183 | A1 * | 8/2001 | Sansom-Wai et al. | 382/289 |
| 2003/0026610 | A1 * | 2/2003 | Malloy Desormeaux | 396/287 |
| 2004/0135887 | A1 * | 7/2004 | Tecu et al. | 348/207.1 |
| 2004/0246269 | A1 * | 12/2004 | Serra et al. | 345/619 |
| 2006/0001650 | A1 * | 1/2006 | Robbins et al. | 345/173 |
| 2006/0197780 | A1 * | 9/2006 | Watkins et al. | 345/620 |
| 2008/0231610 | A1 * | 9/2008 | Hotelling et al. | 345/173 |

OTHER PUBLICATIONS

Kelby, The Photoshop Elements 3 Book for Digital Photographers, Oct. 11, 2004, New Riders, pp. 1-8.*
Microsoft Digital Image Suite 9 article, Microsoft, pp. 1-3.*
Fulton, J. et al., "Adobe Photoshop Elements 3 in a Snap", Dec. 10, 2004.*

* cited by examiner

*Primary Examiner*—Ryan R Yang
(74) *Attorney, Agent, or Firm*—Hickman Palermo Truong & Becker LLP; Brian D. Hickman

(57) ABSTRACT

As the user operates the straighten control, the rotational orientation of a selected image is changed. According to one embodiment, a grid is superimposed over the image while the straighten control is being operated, to assist the user in selecting the proper rotational orientation. In addition, after a rotational adjustment, the image is automatically cropped to ensure that the orientation of the peripheral shape of the image remains unchanged.

24 Claims, 7 Drawing Sheets

STRAIGHTENING DIGITAL IMAGES

FIELD OF THE INVENTION

The present invention relates to manipulating digital images and, more specifically, to changing the changing the rotational orientation of a digital image relative to the device on which the image is displayed.

BACKGROUND

How a work of art is presented to a viewer can have a significant effect on whether the aesthetic merits of the work are fully appreciated. For example, if a painting is tilted, viewers may be so distracted by the tilt of the painting that they cannot fully appreciate the painting's aesthetic qualities.

The need to present art at the correct rotational orientation applies equally to photographs. Like paintings, photographs may be badly oriented relative to the surroundings in which they are displayed. However, the visual content of a photograph may also be badly oriented relative to the photograph's own peripheral shape. Specifically, most photographs are captured as rectangular images. If the photographer is not holding the camera perfectly level relative to the ground at the time a photograph is taken, the image in the photograph may appear tilted relative to the rectangular peripheral shape of the photograph. In such cases, if the photograph is displayed in a manner that correctly orients the visual content of the photograph with the viewer, then the peripheral shape of the photograph will appear tilted. Conversely, if the photograph is displayed in a manner that correctly orients the peripheral shape of the photograph with the viewer, then the visual content of the photograph will appear tilted.

One benefit of digital images is that they may be manipulated to compensate for undesirable characteristics in the originally captured image. For example, many software tools are available to brighten a digital photo when the originally captured version of the photo is undesirably dark. Software tools may also be used to adjust the rotational orientation of digital photos. Unfortunately, just as it is often difficult to determine the perfect rotational orientation of a physical painting without a level, it can be difficult to determine the perfect rotational orientation of a digital image. Further, even when adjustments are made to achieve the perfect rotational orientation of the visual content of a digital photo, there remains the problem of what to do about the incorrect rotational orientation of the peripheral shape of the digital photo that results from such adjustments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques shall be described hereafter for adjusting the rotational orientation of digital images. According to one embodiment, the user is presented with a user interface control for adjusting the rotational orientation of a selected digital image. Such a user interface control shall be referred to herein as a "straighten control". The straighten control may be, for example, a slider.

As the user operates the straighten control, the rotational orientation of a selected image is changed. According to one embodiment, a grid is superimposed over the image while the straighten control is being operated, to assist the user in selecting the proper rotational orientation. In addition, after a rotational adjustment, the image is automatically cropped to ensure that the orientation of the peripheral shape of the image remains unchanged.

For example, assume that the digital photo was rectangular before the rotational adjustment, with top and bottom edges that were horizontal relative to a display screen and side edges that were vertical to the display screen. After the rotational adjustment, the digital photo is automatically cropped so that it retains the shape of a rectangle that has top and bottom edges that are horizontal relative to the display screen, and side edges that are vertical relative to the display screen.

Auto-Display Grid

According to one embodiment, a grid is superimposed over the selected image during operation of the straighten control. According to one embodiment, the grid is displayed automatically in response to a user starting to interact with the straighten control. Conversely, the grid ceases to be displayed automatically in response to the user ceasing to interact with the straighten control.

For the purpose of illustration, an embodiment shall be described in which the straighten control is a slider. However, the straighten control is not limited to any particular type of user interface control. For example, the straighten control may alternatively involve pressing a particular key combination on a keyboard to cause clockwise rotation of the image, and another key combination on the keyboard to cause counter-clockwise rotation of the image.

Figure 1:
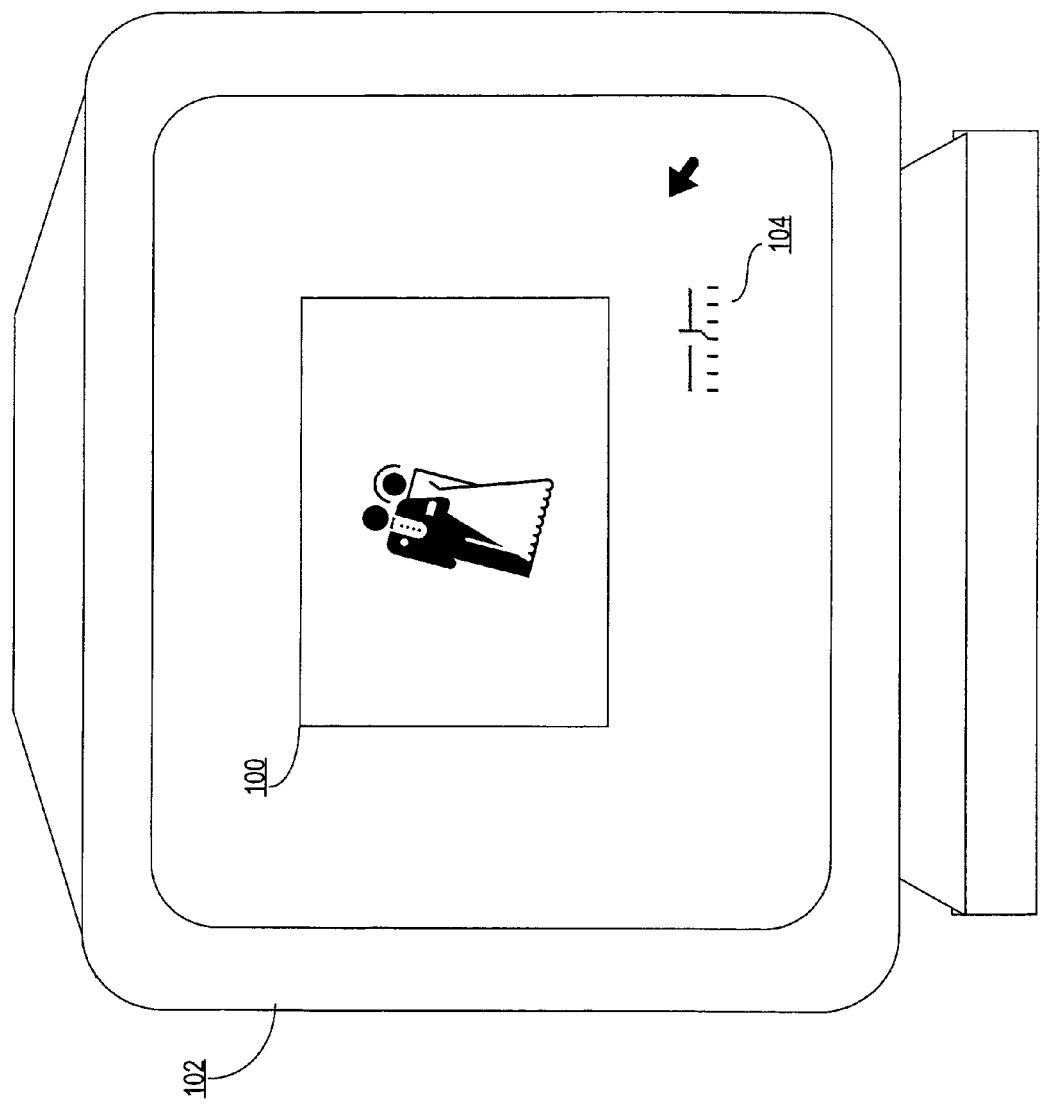
FIG. 1 is a block diagram illustrating a screen displaying a digital image that was captured at the wrong angle.
Figure 2:
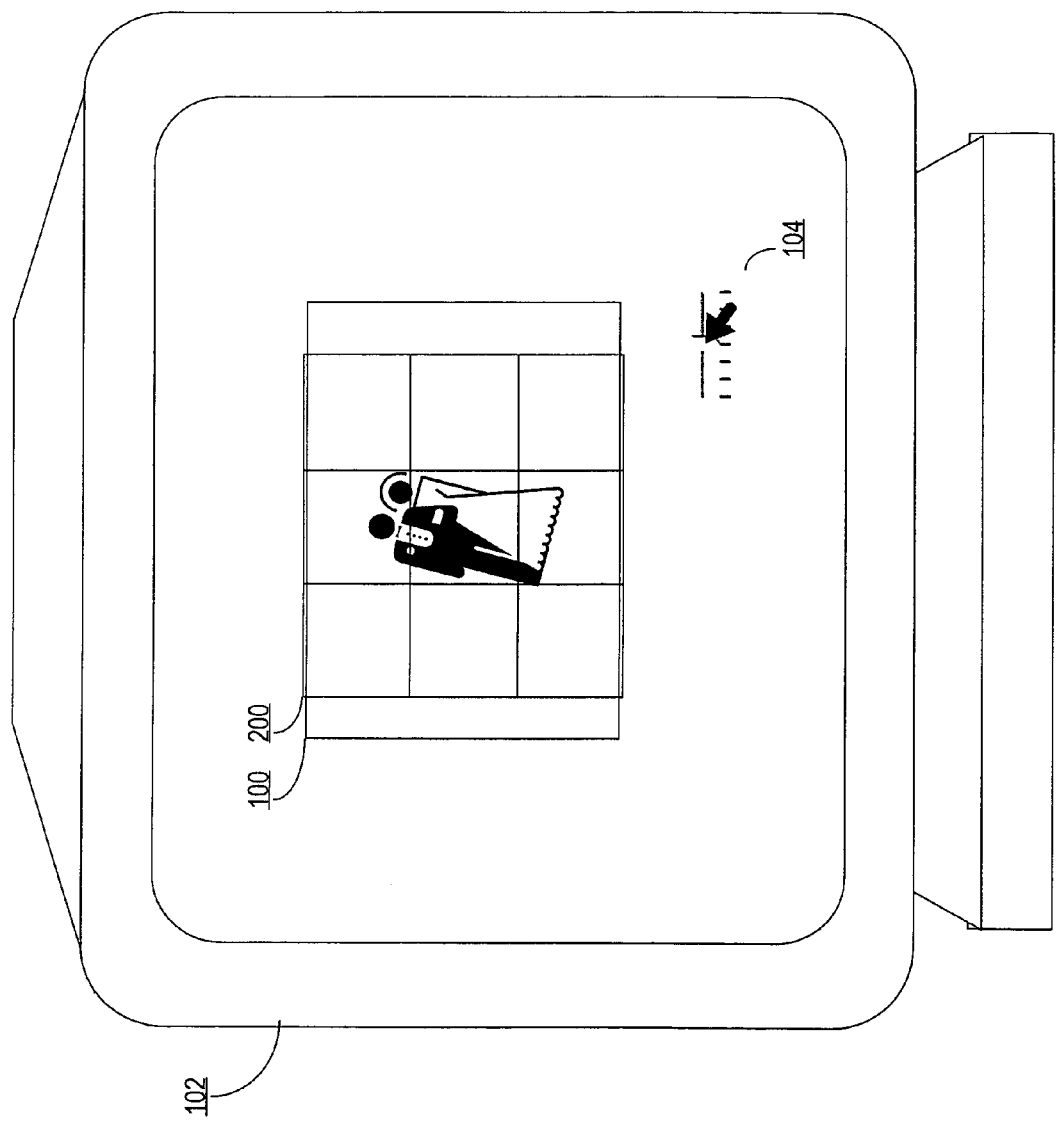
FIG. 2 is a block diagram illustrating a straighten tool that automatically superimposes a grid over a digital image while the rotational orientation of the image is being adjusted.
Figure 3:
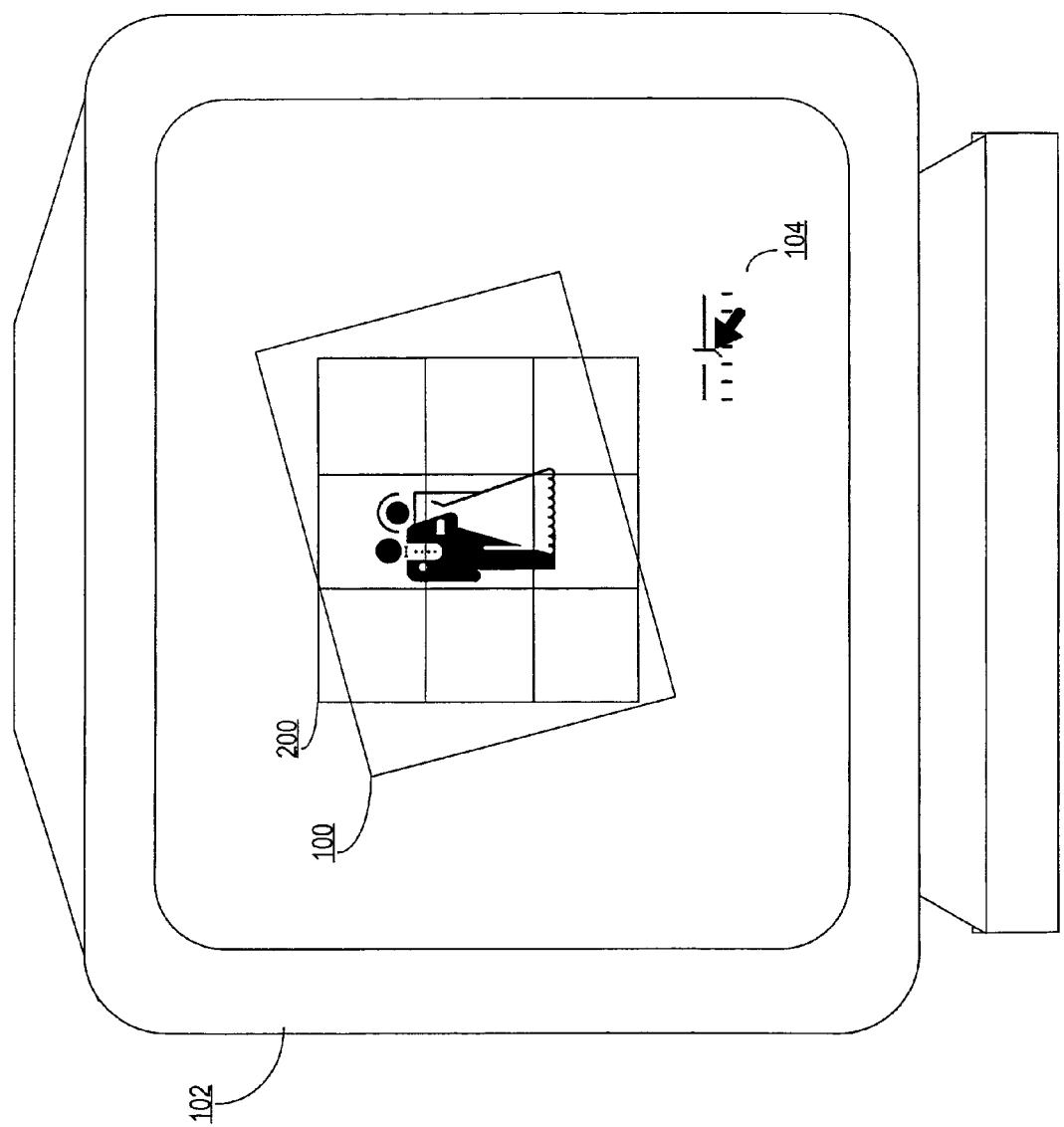
FIG. 3 is a block diagram illustrating how the rotational orientation of the digital image is adjusted without changing the orientation of the superimposed grid.

Referring to FIG. 1, it is a block diagram illustrating a badly aligned digital image 100 that is displayed on a display screen 102. Also displayed on the display screen 102 is a slider 104 that serves as the straighten control. When the user clicks on the slider 104, a grid 200 is automatically superimposed over the image 100, as illustrated in FIG. 2. As the user slides the slider 104, the image 100 is rotated without rotating the superimposed grid 200. By comparing the orientation of the visual content of the image against the orientation of the grid 200, the user may more easily determine the best rotational orientation of the visual content. FIG. 3 illustrates image 100 after the user has adjusted the rotational orientation using slider 104.

Figure 4:
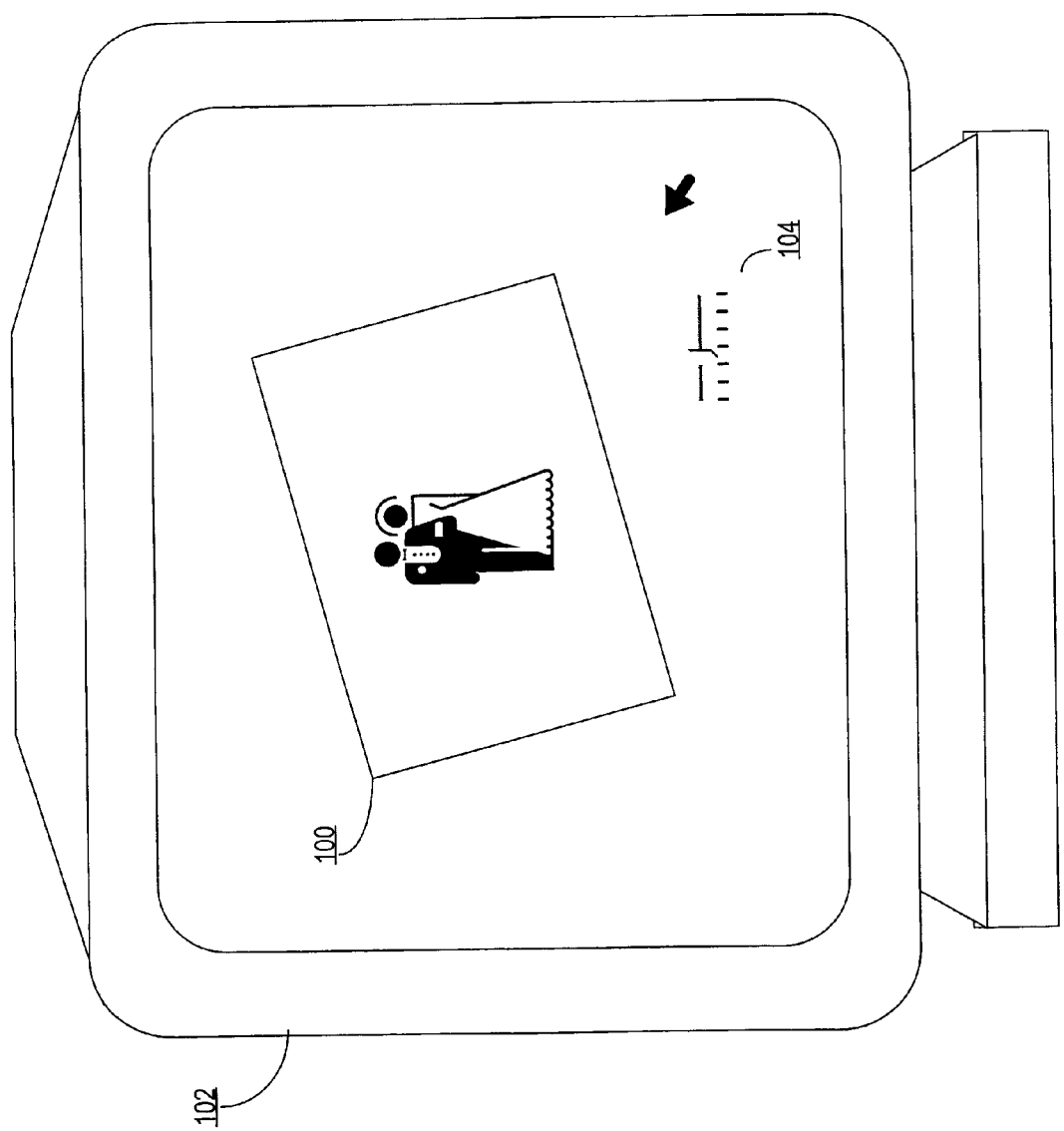
FIG. 4 is a block diagram illustrating the adjusted image, where the superimposed grid has automatically ceased to be displayed because the user has stopped interacting with the straighten tool.

After the user selects what he or she considers to be the best rotational orientation of the visual content, the user releases the mouse button. Releasing the mouse button signals the end of the user's interaction with the slider 104, and therefore causes the superimposed grid to disappear, as illustrated in FIG. 4.

A grid is merely one example of the type of visual information that may be superimposed over the image to assist the user in determining the best rotational orientation of the image. For example, the superimposed visual information may simply be one or more horizontal lines and/or one or more vertical lines.

Under certain circumstances, it may be desirable to select a rotational orientation that is not exactly aligned with the display screen. For example, a user may want to orient an image at a 50 degree angle relative to the display screen. Under these circumstances, the superimposed visual information may include lines that are at a 50 degree angle relative to the display screen. To provide flexibility, the characteristics of the superimposed visual information may be selectable by a user. For example, in an embodiment where the superimposed visual information is a grid, the user may specify the angle, width, style, and spacing of the lines in the grid.

Maintaining Peripheral Orientation

As mentioned above, having the correct rotational orientation is important for both (1) the visual content of an image and (2) the peripheral shape of the image. Thus, it is generally not desirable to leave an image in the condition illustrated in FIG. 4, where the adjustment made to correct the rotational orientation of the visual content of image 100 has left the peripheral shape of the image 100 maladjusted relative to the display 102.

To address this problem, techniques are provided for automatically adjusting images, after a rotational orientation adjustment, so that the rotational orientation of the peripheral shape of the images is not affected by the adjustment. Various techniques may be used to retain the rotational orientation of the peripheral shape of an image after the rotational orientation of the image has been adjusted. For example, the desired orientation of the peripheral shape may be retained using "filler" data, or selective cropping. Each of these techniques shall be described in detail below.

Filler Data

According to one embodiment, the rotational orientation of an image is retained after a rotational orientation adjustment by creating a new image that (1) has the same shape and peripheral orientation as the original image, (2) includes the rotated visual content of the image, and (3) adds "filler data" where the rotated visual content does not have information for certain sections of the region bounded by the shape.

Figure 5:
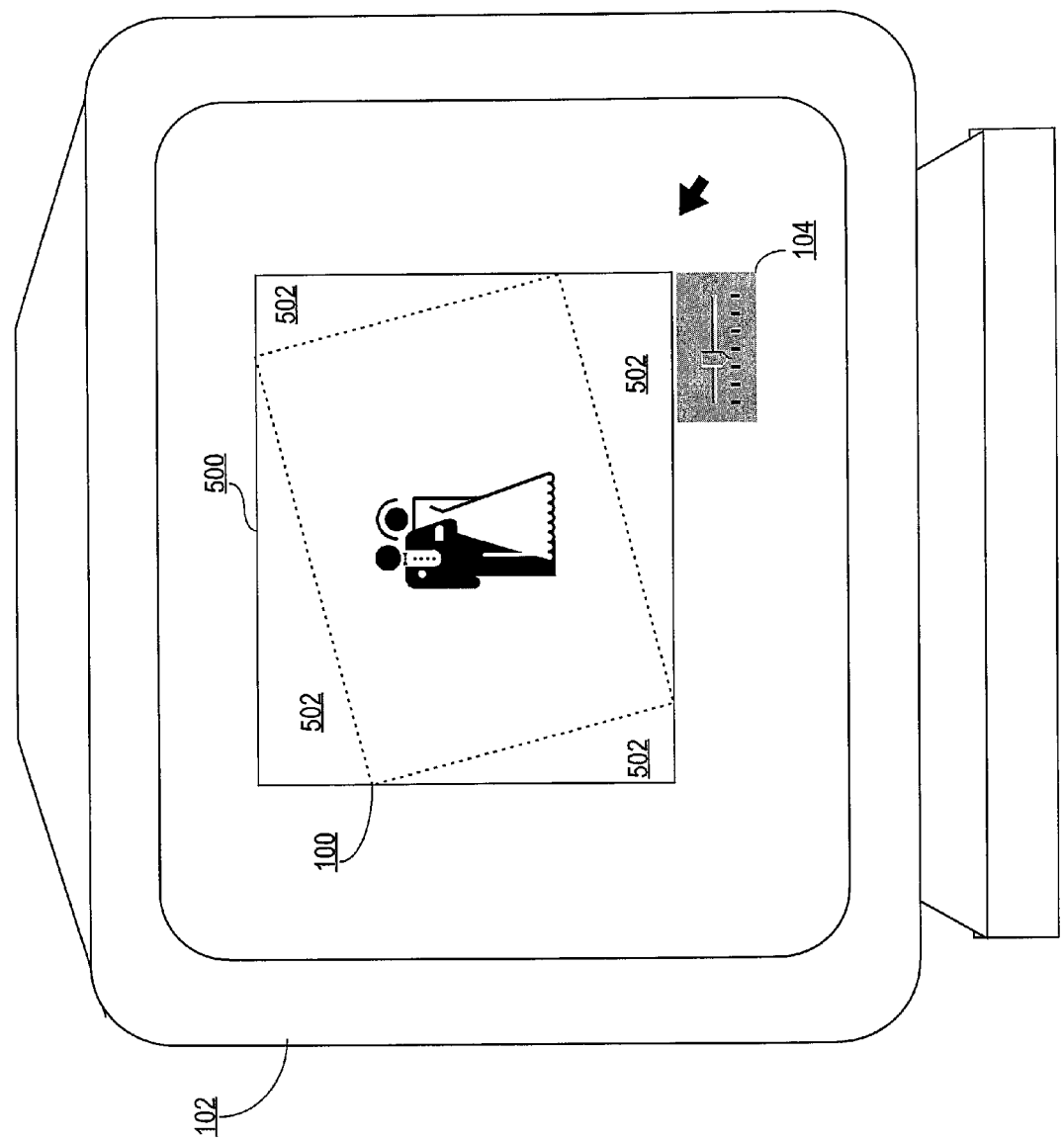
FIG. 5 is a block diagram illustrating how, after adjustment to the rotational orientation of the content of the image, filler data may be added to correct the rotational orientation of the peripheral shape of the image.

Referring to FIG. 5, it illustrates the image 500 created by adding filler data 502 to the rotated image 100 of FIG. 3. As illustrated in FIG. 5, the peripheral shape of image 500 is a rectangle that is oriented relative to display screen 102 in the same rotational orientation as the rectangle that bounds the original image 100 illustrated in FIG. 1. The filler data 502 used to create image 500 may take many forms. For example, the filler data 502 may be data that generates pixels of a particular color, such as white, black, or a color that is selected based on the color content of the original image.

Auto-Cropping

Figure 6:
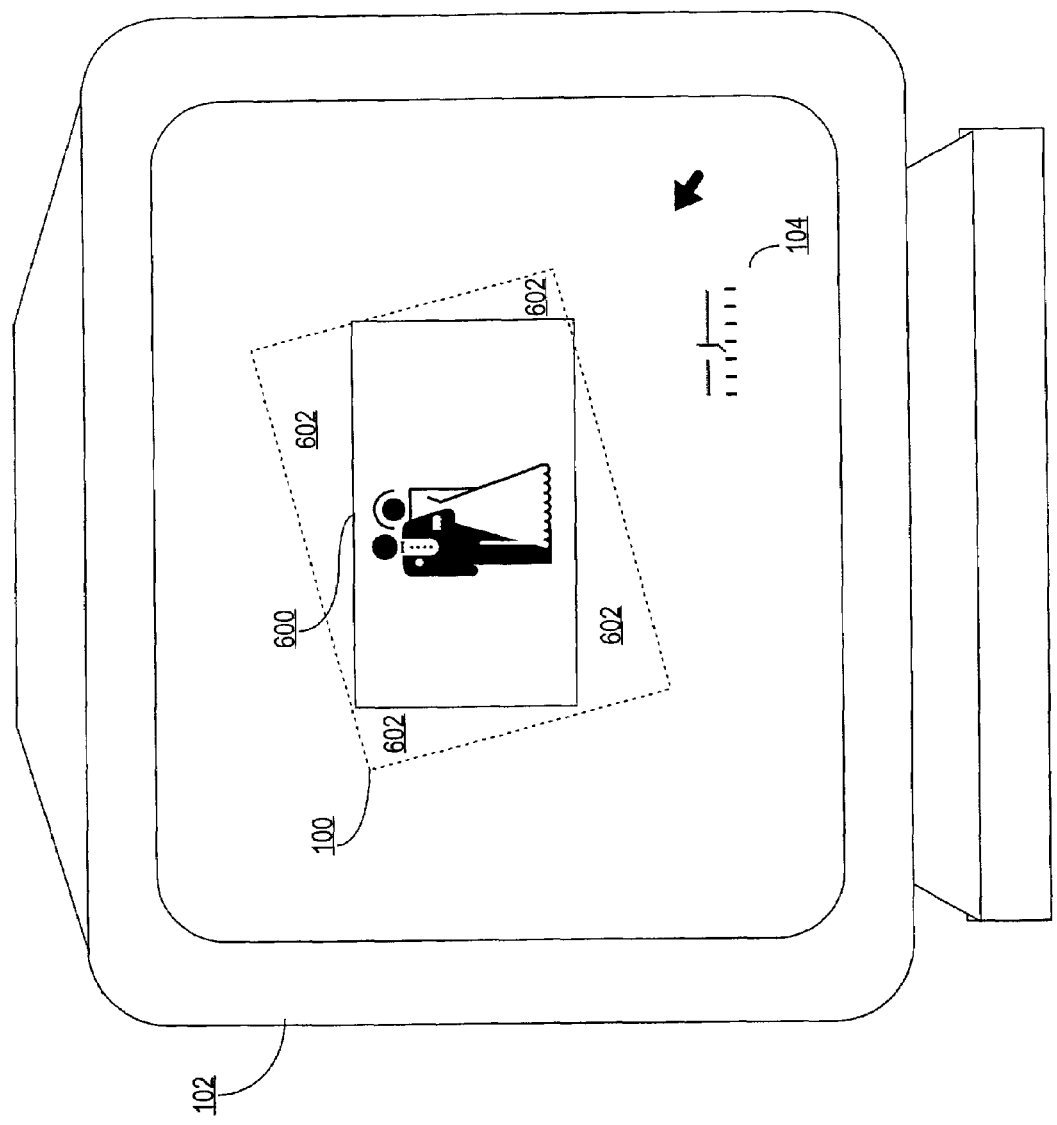
FIG. 6 is a block diagram illustrating how, after adjustment to the rotational orientation of the content of the image, the image may automatically be cropped to correct the rotational orientation of the peripheral shape of the image.

According to one embodiment, an image is cropped as necessary to maintain the original orientation of the peripheral shape. For example, the image 100 of FIG. 3 may be automatically cropped to produced a cropped image 600 as illustrated in FIG. 6. During the cropping operation, certain pieces 602 of the original image are removed from the rotated image.

To retain as much visual information as possible in the rotated image, it may be necessary to crop the image in a manner that does not retain the original aspect ratio of the image. In an alternative embodiment, the automatic cropping operation may be designed to retain the original aspect ratio, potentially resulting in the loss of more visual information during the cropping process.

According to one embodiment, as the user rotates the visual content of the image using the straighten tool, the image is displayed to the user in the size and shape that the image will have if the auto-cropping operation were to be performed based on the currently displayed rotational orientation. By displaying the cropping effect that will result from a rotational adjustment, the user is able to balance the loss of visual content (due to cropping) against the benefit derived from correcting the rotational orientation of the content. Even though the post-cropping image is displayed while the user manipulates the straighten tool, the actual cropping may not be performed until the user has indicated that the rotational adjustment is final.

Hardware Overview

Figure 7:
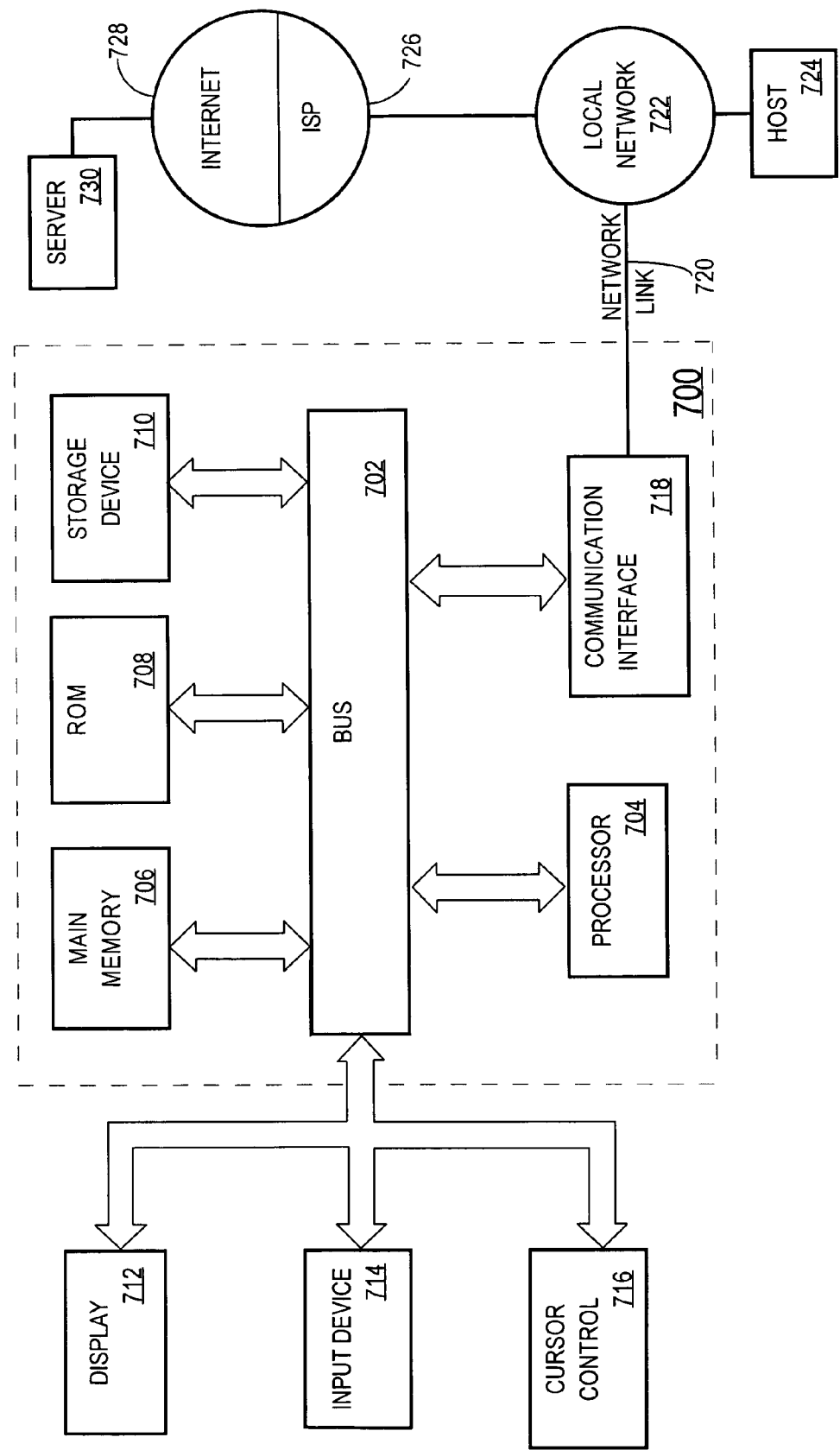
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for straightening a digital image, the method comprising:

displaying the digital image on a display device;

wherein the digital image is a pre-crop image;

receiving first user input from a user interface control;

in response to the first input, entering a mode in which:

as a user enters second input, the rotational orientation of the visual content of the pre-crop image dynamically changes relative to the display device;

as the rotational orientation of the visual content of the pre-crop image is being dynamically changed relative to the display device based on the second input, the rotational orientation of the peripheral shape of the pre-crop image relative to the display device does not change;

as the rotational orientation of the visual content of the pre-crop image is being dynamically changed, an indication of how the pre-crop image will be cropped to create a post-crop image is automatically displayed in response to changing the rotational orientation of the visual content;

wherein the pre-crop image and post-crop images are different images and the pre-crop image contains the post-crop image; and in response to third input, exiting the mode while leaving the rotational orientation of the visual content of the pre-crop image at the rotational orientation of the visual content that currently exists at the time the third input is received.

2. The method of claim 1 wherein:

the step of changing the rotational orientation of the visual content of the pre-crop image is performed without changing the aspect ratio of the peripheral shape of the pre-crop image; and the aspect ratio of the peripheral shape is retained by automatically cropping the pre-crop image in response to the same third input that causes the mode to be exited.

3. The method of claim 2 further comprising the step of, while receiving said second input, visually depicting how the peripheral shape of the pre-crop image would be automatically cropped based on the current degree of rotational orientation adjustment.

4. The method of claim 1 further comprising, in response to the same third input that causes the mode to be exited, automatically cropping the pre-crop image to reduce the size of the peripheral shape of the pre-crop image relative to at least one dimension.

5. The method of claim 1 wherein the step of changing the rotational orientation of the visual content of the pre-crop image relative to the display device without changing the rotational orientation of the peripheral shape of the pre-crop image relative to the display device includes automatically performing a cropping operation on the pre-crop image in response to changing the rotational orientation of the visual content.

6. The method of claim 5 wherein:

the pre-crop image has the same peripheral shape as the post-crop image; and after the cropping operation, the peripheral shape of the post-crop image has the same rotational orientation, relative to the display device, that the pre-crop image had prior to the adjustment to the rotational orientation of the visual content of the pre-crop image.

7. The method of claim 1 wherein:

the first input is selection of a slider control;

the second input is movement of the slider control; and the third input is de-selection of the slider control.

8. A method for straightening a digital image, the method comprising:

displaying the digital image on a display device;

detecting that a user has started to interact with a slider;

in response to detecting that the user has started to interact with the slider, performing steps comprising:

automatically superimposing visual information that separates the digital image into three or more subareas over at least a portion of the digital image; and dynamically changing the rotational orientation of the visual content of the digital image relative to the display device without changing the rotational orientation of the superimposed visual information that separates the digital image into three or more subareas relative to the display device.

9. The method of claim 8 further comprising automatically ceasing to display the superimposed visual information that separates the digital image into three or more subareas in response to detecting that said user has ceased to interact with said slider.

10. The method of claim 8 wherein the superimposed visual information that separates the digital image into three or more subareas includes at least one of a vertical line and a horizontal line.

11. The method of claim 8 wherein the superimposed visual information that separates the digital image into three or more subareas has characteristics that are dictated by one or more user-specified parameters.

12. The method of claim 8, wherein the superimposed visual information that separates the digital image into three or more subareas is a grid.

13. A computer-readable storage medium storing instructions for straightening a digital image, the instructions including instructions which, when executed by one or more processors, cause the one or more processors to perform the steps of:

displaying the digital image on a display device;

wherein the digital image is a pre-crop image;

receiving first user input from a user interface control;

in response to the first input, entering a mode in which:

as a user enters second input, the rotational orientation of the visual content of the pre-crop image dynamically changes relative to the display device;

as the rotational orientation of the visual content of the pre-crop image is being dynamically changed relative to the display device based on the second input, the rotational orientation of the peripheral shape of the pre-crop image relative to the display device does not change;

as the rotational orientation of the visual content of the pre-crop image is being dynamically changed, an indication of how the pre-crop image will be cropped to create a post-crop image is automatically displayed in response to changing the rotational orientation of the visual content;

wherein the pre-crop image and post-crop images are different images and the pre-crop image contains the post-crop image; and in response to third input, exiting the mode while leaving the rotational orientation of the visual content of the pre-crop image at the rotational orientation of the visual content that currently exists at the time the third input is received.

14. The computer-readable storage medium of claim 13 wherein:

the step of changing the rotational orientation of the visual content of the pre-crop image is performed without changing the aspect ratio of the peripheral shape of the pre-crop image; and the aspect ratio of the peripheral shape is retained by automatically cropping the pre-crop image in response to the same third input that causes the mode to be exited.

15. The computer-readable storage medium of claim 14 further comprising instructions for performing the step of, while receiving said second input, visually depicting how the peripheral shape of the pre-crop image would be automatically cropped based on the current degree of rotational orientation adjustment.

16. The computer-readable storage medium of claim 13 further comprising instructions for, in response to the same third input that causes the mode to be exited, automatically cropping the pre-crop image to reduce the size of the peripheral shape of the pre-crop image relative to at least one dimension.

17. The computer-readable storage medium of claim 13 wherein the step of changing the rotational orientation of the visual content of the pre-crop image relative to the display device without changing the rotational orientation of the peripheral shape of the pre-crop image relative to the display device includes automatically performing a cropping operation on the pre-crop image in response to changing the rotational orientation of the visual content.

18. The computer-readable storage medium of claim 17 wherein:
the pre-crop image has the same peripheral shape as the post-crop image; and
after the cropping operation, the peripheral shape of the post-crop image has the same rotational orientation, relative to the display device, that the pre-crop image had prior to the adjustment to the rotational orientation of the visual content of the pre-crop image.

19. The computer-readable storage medium of claim 13 wherein:
the first input is selection of a slider control;
the second input is movement of the slider control; and
the third input is de-selection of the slider control.

20. A computer-readable storage medium storing instructions for straightening a digital image, the instructions including instructions which, when executed by one or more processors, cause the one or more processors to perform the steps of:
displaying the digital image on a display device;
detecting that a user has started to interact with a slider;
in response to detecting that the user has started to interact with the slider, performing steps comprising:
automatically superimposing visual information that separates the digital image into three or more subareas over at least a portion of the digital image; and
dynamically changing the rotational orientation of the visual content of the digital image relative to the display device without changing the rotational orientation of the superimposed visual information that separates the digital image into three or more subareas relative to the display device.

21. The computer-readable storage medium of claim 20 further comprising instructions for automatically ceasing to display the superimposed visual information that separates the digital image into three or more subareas in response to detecting that said user has ceased to interact with said slider.

22. The computer-readable storage medium of claim 20 wherein the superimposed visual information that separates the digital image into three or more subareas includes at least one of a vertical line and a horizontal line.

23. The computer-readable storage medium of claim 20 wherein the superimposed visual information that separates the digital image into three or more subareas has characteristics that are dictated by one or more user-specified parameters.

24. The computer-readable storage medium of claim 20 wherein the superimposed visual information that separates the digital image into three or more subareas is a grid.

* * * * *